United States Patent
Kihara et al.

(10) Patent No.: US 9,306,400 B2
(45) Date of Patent: Apr. 5, 2016

(54) POWER TRANSMISSION DEVICE AND WAVEFORM MONITOR CIRCUIT FOR USE IN POWER TRANSMISSION DEVICE

(71) Applicant: PANASONIC CORPORATION, Osaka (JP)

(72) Inventors: Hideyuki Kihara, Kanagawa (JP); Kazuyo Ohta, Chiba (JP); Kazuhiro Suzuki, Shiga (JP); Kyohei Kada, Shiga (JP); Takaoki Matsumoto, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 815 days.

(21) Appl. No.: 13/628,845

(22) Filed: Sep. 27, 2012

(65) Prior Publication Data
US 2013/0020879 A1 Jan. 24, 2013

Related U.S. Application Data

(63) Continuation of application No. PCT/JP2011/000786, filed on Feb. 14, 2011.

(30) Foreign Application Priority Data

Mar. 29, 2010 (JP) ................................ 2010-074806

(51) Int. Cl.
*H01F 27/42* (2006.01)
*H01F 37/00* (2006.01)
(Continued)

(52) U.S. Cl.
CPC .............. *H02J 5/005* (2013.01); *H04B 5/0037* (2013.01); *H04B 5/0093* (2013.01)

(58) Field of Classification Search
CPC .......... H02J 5/005; H02J 7/025; H02J 17/00; H02J 7/007; H02J 7/0052; H02J 3/01; H02J 7/00; H02J 7/0004; H02J 7/0042; H02J 2007/0037; H02J 2007/005; H02J 2007/0096; H02J 7/0011; H02J 7/0013
USPC ......................................................... 307/104
See application file for complete search history.

(56) References Cited

U.S. PATENT DOCUMENTS 5,796,277 A * 8/1998 Kim et al. ...................... 327/108
8,000,800 B2 * 8/2011 Takeda et al. ................... 607/61
(Continued)

FOREIGN PATENT DOCUMENTS

CN        101442221 A    5/2009
JP      2003-348774 A   12/2003
(Continued)

OTHER PUBLICATIONS

Chinese Office Action issued in Chinese Application No. 201180017660.5 dated Apr. 30, 2014, w/Partial English translation.
(Continued)

*Primary Examiner* — Hal Kaplan
*Assistant Examiner* — Esayas Yeshaw
(74) *Attorney, Agent, or Firm* — McDermott Will & Emery LLP

(57) ABSTRACT

A power transmission device in a power transmission system including the power transmission device including a primary coil and a power reception device including a secondary coil, the primary coil being electromagnetically coupled to the secondary coil, to receive in the power reception device AC power transmitted from the power transmission device, comprises a waveform monitor circuit configured to detect an electric potential at one end of the primary coil and output a waveform monitor signal formed by restricting the detected electric potential to an electric potential which is equal to or higher than a ground electric potential; a waveform detection circuit configured to detect a waveform change in the waveform monitor signal input from the waveform monitor circuit; and a data detection circuit configured to detect data transmitted by load change by a load modulation unit in the power reception device based on a result of detection of the waveform change detected by the waveform detection circuit.

12 Claims, 10 Drawing Sheets

(51) Int. Cl.
*H01F 38/00* (2006.01)
*H02J 5/00* (2006.01)
*H04B 5/00* (2006.01)

(56) References Cited

U.S. PATENT DOCUMENTS

| | | | |
|---|---|---|---|
| 8,035,255 B2* | 10/2011 | Kurs et al. | 307/104 |
| 2005/0165461 A1 | 7/2005 | Takeda et al. | |
| 2006/0192774 A1* | 8/2006 | Yasumura | 345/211 |
| 2009/0009006 A1* | 1/2009 | Jin et al. | 307/104 |
| 2009/0026844 A1* | 1/2009 | Iisaka et al. | 307/104 |
| 2009/0079269 A1* | 3/2009 | Jin | 307/104 |
| 2009/0133942 A1 | 5/2009 | Iisaka et al. | |
| 2010/0013321 A1* | 1/2010 | Onishi et al. | 307/104 |
| 2010/0073137 A1* | 3/2010 | Kobayashi | 340/10.1 |

FOREIGN PATENT DOCUMENTS

| | | |
|---|---|---|
| JP | 2009-033782 A | 2/2009 |
| JP | 2009-033955 A | 2/2009 |
| JP | 2010-028897 A | 2/2010 |

OTHER PUBLICATIONS

International Search Report issued in International Patent Application No. PCT/JP2011/000786 dated May 10, 2011.

* cited by examiner

POWER TRANSMISSION DEVICE AND WAVEFORM MONITOR CIRCUIT FOR USE IN POWER TRANSMISSION DEVICE

CROSS REFERENCE TO THE RELATED APPLICATION

This application is a continuation of PCT International Application No. PCT/JP2011/000786, filed on Feb. 14, 2011, which in turn claims the benefit of Japanese Application No. 2010-074806, filed on Mar. 29, 2010, the disclosures of which Applications are incorporated by reference herein.

BACKGROUND OF THE INVENTION

1. Field of the Invention

The present invention relates to a power transmission device and a waveform monitor circuit for use in the power transmission device.

2. Description of the Related Art

In recent years, a contactless power transmission method (also referred to as wireless power transmission method) which enables power transmission without a contact of a metal portion by utilizing electromagnetic induction has attracted lots of attention. Japanese Laid-Open Patent Application Publication No. 2009-33955 discloses a prior art of such a contactless power transmission method. This prior art discloses a waveform monitor circuit in which, in a case where data communication is performed from a power reception device (secondary side) toward a power transmission device (primary side), a signal (coil end signal) induced by a primary coil based on load modulation at the power reception side, is taken out and rectified, thereby generating a waveform monitor signal used for detecting a load state at the power reception side.

FIG. 10 is a block diagram showing the configuration of a power transmission device of a power transmission system including the waveform monitor circuit disclosed in Publication No. 2009-33955. Referring to FIG. 10, the power transmission device includes a waveform monitor circuit 414 which generates an induced voltage signal used for detecting a load state based on a coil end signal which is a signal at one end of a primary coil L1 and is generated by load modulation at the power reception side and outputs the induced voltage signal, and a power-transmission control device 420 including a waveform detection circuit 430 for detecting a change in the waveform of the induced voltage signal input from the waveform monitor circuit 414. The power-transmission control device 420 detects the load state at the power reception side based on a result of detection performed by the waveform detection circuit 430.

The waveform monitor circuit 414 includes a current restricting (controlling) resistor RA1 provided between a coil end node NA2 at which a coil end signal CSG of the primary coil L1 is generated, and a monitor node NA11 at which an induced voltage signal PHIN1 used for detecting the load state at the power reception side is generated. The waveform monitor circuit 414 further includes a rectification circuit 417 with a limiter function which performs a limiter operation for clamping the induced voltage signal PHIN1 at a VDD electric potential and performs half-wave rectification of the induced voltage signal PHIN1.

The rectification circuit 417 includes a diode DA1 and a diode DA2. The diode DA1 is provided between the monitor node NA11 and a VDD node such that a direction from the monitor node NA11 toward the VDD node is a forward direction. The diode DA1 allows the induced voltage signal PHIN1 to be clamped at the VDD electric potential and a voltage which is equal to or higher than a maximum rated voltage to be prevented from being applied to an IC terminal of the power-transmission control device 420. By comparison, the diode DA2 is provided between the monitor node NA11 and a ground terminal such that a direction from the ground terminal toward the monitor node NA11 is a forward direction. The diode DA2 allows induced voltage signal PHIN1 to be half-wave rectified.

In the power transmission device of FIG. 10, a voltage reference of the primary coil L1 is not determined. Therefore, there are a case where the coil end signal CSG of the primary coil L1 becomes a positive voltage on the basis of a ground electric potential, and a case where the coil end signal CSG of the primary coil L1 becomes a negative voltage on the basis of the ground electric potential. In the case where the coil end signal CSG of the primary coil L1 changes from the positive voltage to the negative voltage on the basis of the ground electric potential, a forward current flows from the ground terminal toward the monitor node NA11 in the diode DA2. Thereby, an electric potential (electric potential of the induced voltage signal PHIN1) at the monitor node NA11 is lowered by an electric potential of a forward voltage (threshold voltage) VT2 of the diode DA2 with respect to the ground electric potential.

Every time the coil end signal CSG of the primary coil L1 becomes the negative voltage on the basis of the ground electric potential, the electric potential at the monitor node NA11 in the waveform detection circuit 430 is not clipped at a desired electric potential in half-wave rectification, is lowered by the electric potential of the forward voltage VT2 generated in the diode DA2 and becomes the negative voltage on the basis of the ground electric potential. Therefore, there exists a problem that the negative voltage is applied to the IC terminal of the power-transmission control device 420, thereby producing, for example, a parasitic effect (latch up, etc.) which causes breakdown of an electric circuit element included in the power-transmission control device 420.

SUMMARY OF THE INVENTION

The present invention is directed to solving the above stated problem, and an object of the present invention is to prevent a waveform monitor signal of a negative voltage from being input to a waveform detection circuit, by always setting an electric potential of a waveform monitor signal used for monitoring an electric potential waveform at one end of a primary coil to detect a load state at a power reception side, higher than a ground electric potential.

According to one aspect of the present invention, there is provided a power transmission device in a power transmission system including the power transmission device including a primary coil and a power reception device including a secondary coil, the primary coil being electromagnetically coupled to the secondary coil, to receive in the power reception device AC power transmitted from the power transmission device, the power transmission device comprising: a waveform monitor circuit configured to detect an electric potential at one end of the primary coil and output a waveform monitor signal formed by restricting the detected electric potential to an electric potential which is equal to or higher than a ground electric potential; a waveform detection circuit configured to detect a waveform change in the waveform monitor signal input from the waveform monitor circuit; and a data detection circuit for detecting data transmitted by load change by a load modulation unit in the power reception device based on a result of detection of the waveform change detected by the waveform detection circuit.

The phrase "restricted to an electric potential equal to or higher than a ground electric potential" means that a certain electric potential is limited or clipped so that it becomes the ground electric potential or higher. In accordance with this configuration, the electric potential of the waveform monitor signal input to the waveform detection circuit, i.e., the electric potential at one end of the primary coil, is restricted to the ground electric potential or higher. Because of this, it is possible to prevent a waveform monitor signal having an electric potential (negative voltage) lower than the ground electric potential from being input to the waveform detection circuit.

In the power transmission device, the waveform monitor circuit may include: a rectification circuit including a diode provided between one end of the primary coil and an input end of the waveform detection circuit such that a direction from the one end of the primary coil to the input end of the waveform detection circuit is a forward direction; and a first resistor, one end of which is connected onto a signal line between a cathode side of the diode and the input end of the waveform detection circuit, and the other end of which is connected to a ground terminal held at a ground electric potential.

In the power transmission device, the rectification circuit further may include a second resistor provided between the cathode side of the diode and the ground terminal, or a second resistor provided between the one end of the primary coil and an anode side of the diode.

In accordance with this configuration, when the electric potential at one end of the primary coil becomes the negative voltage (electric potential lower than the ground electric potential) on the basis of the ground electric potential, a flow of a current from the one end of the primary coil to the input end of the waveform detection circuit is blocked, and thus, the electric potential of the waveform monitor signal input to the input terminal of the waveform detection circuit becomes the ground electric potential via the first resistor. This makes it possible to prevent the waveform monitor signal having the negative voltage from being input to the waveform detection circuit.

In the power transmission device, the waveform monitor circuit may include: a rectification circuit including a diode provided between the one end of the primary coil and the input end of the waveform detection circuit such that a direction from the one end of the primary coil toward the input end is a forward direction, and a second resistor provided at an anode side of the diode; a first resistor, one end of which is connected onto a signal line between the anode side of the diode and the second resistor, and the other end of which is connected to a ground terminal held at a ground electric potential; and a third resistor, one end of which is connected to a cathode side of the diode and the other end of which is connected to a ground terminal held at a ground electric potential.

In the power transmission device, the rectification circuit may further include a fourth resistor provided between the cathode side of the diode and the input end of the waveform detection circuit, or a fifth resistor provided between the anode side of the diode and the second resistor.

In accordance with this configuration, when the electric potential at the one end of the primary coil becomes the negative voltage (electric potential lower than the ground electric potential) on the basis of the ground electric potential, a flow of a current from the one end of the primary coil to the input end of the waveform detection circuit is blocked, and thus, the electric potential of the waveform monitor signal input to the input terminal of the waveform detection circuit becomes the ground electric potential via the third resistor. This makes it possible to prevent the waveform monitor signal having the negative voltage from being input to the waveform detection circuit.

In the power transmission device, the diode may be a Schottky barrier diode, or a zener diode.

According to another aspect of the present invention, there is provided a waveform monitor circuit provided in a power transmission device in a power transmission system including the power transmission device including a primary coil and a power reception device including a secondary coil, the primary coil being electromagnetically coupled to the secondary coil, to receive in the power reception device AC power transmitted from the power transmission device, the waveform monitor circuit comprising: a rectification circuit provided between one end of the primary coil and an input end of the waveform detection circuit such that a direction from the one end of the primary coil to the input end of the waveform detection circuit is a forward direction; and a first resistor, one end of which is connected onto a signal line between an output end of the rectification circuit and the input end of the waveform detection circuit, and the other end of which is connected to a ground terminal held at a ground electric potential.

According to another aspect of the present invention, there is provided a waveform monitor circuit provided in a power transmission device in a power transmission system including the power transmission device including a primary coil and a power reception device including a secondary coil, the primary coil being electromagnetically coupled to the secondary coil, to receive in the power reception device AC power transmitted from the power transmission device, the waveform monitor circuit comprising: a rectification circuit including a diode provided between one end of the primary coil and an input end of the waveform detection circuit such that a direction from the one end of the primary coil to the input end of the waveform detection circuit is a forward direction, and a second resistor provided at an anode side of the diode; a first resistor, one end of which is connected onto a signal line between an anode side of the diode and the second resistor, and the other end of which is connected to a ground terminal held at a ground electric potential; and a third resistor one end of which is connected to a cathode side of the diode and the other end of which is connected to a ground terminal held at a ground electric potential.

The above and further objects, features and advantages of the present invention will more fully be apparent from the following detailed description of preferred embodiments with accompanying drawings.

DETAILED DESCRIPTION OF THE PREFERRED EMBODIMENTS

Figure 1:
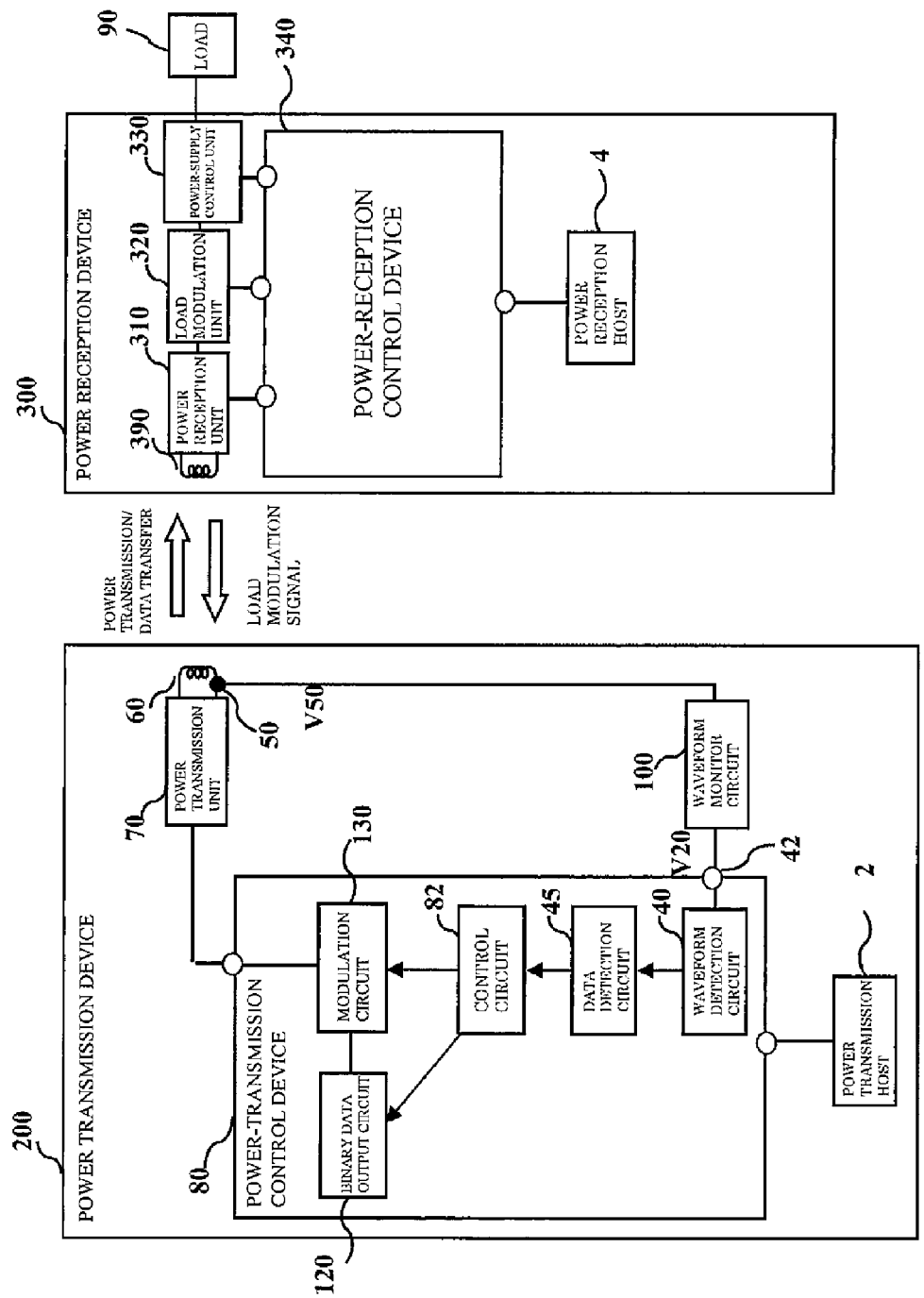
FIG. 1 is a block diagram showing the configuration of a power transmission system according to Embodiment 1 of the present invention.

Hereinafter, preferred embodiments of the present invention will be described with reference to the drawings. Throughout the drawings, the same or corresponding components are identified by the same reference numerals and will not be described in repetition.

(Embodiment 1)

[Schematic Configuration of Power Transmission System]

FIG. 1 is a block diagram showing the configuration of a power transmission system according to Embodiment 1 of the present invention.

Referring to FIG. 1, the power transmission system includes a power transmission device 200 including a primary coil 60 and a power reception device 300 including a secondary coil 390, and is configured such that the primary coil 60 and the secondary coil 390 are electromagnetically coupled together to construct a power transmission transformer. This enables electric power to be transmitted from the power transmission device 200 to the power reception device 300, and hence the electric power to be supplied to a load 90.

The power transmission device 200 is built into an apparatus at a power transmission side. The apparatus at the power transmission side is, for example, a charging apparatus. The power reception device 300 is built into electronic equipment at a power reception side. The electronic equipment at the power reception side is, for example, a cellular phone, an electric shaver, an electric brush, a wrist computer, a handy terminal, a watch, a codeless phone, a PDA (personal digital assistance), an electric vehicle, an IC card, etc. In a case where the electronic equipment at the power reception side is, for example, the cellular phone, the cellular phone is used as follows. When transmission of electric power is necessary, the cellular phone is placed in close proximity on a specified flat surface of the charging apparatus in a contactless (wireless) manner to allow a magnetic flux of the primary coil 60 to pass through the secondary coil 390. On the other hand, when transmission of electric power is unnecessary, the cellular phone is placed physically apart from the charging apparatus to prevent the magnetic flux of the primary coil 60 from passing through the secondary coil 390.

In the power transmission system of FIG. 1, inter-host communication between a host 2 at a power transmission side (power transmission host) 2 and a host 4 at a power reception side (power reception host) 4, based on a contactless (wireless) power transmission method, is enabled.

The data communication from the power transmission side to the power reception side is implemented by transmitting a power transmission wave modulated (frequency-modulated, phase-modulated, or frequency-phase-modulated) according to the data. Hereinafter, the configuration for performing frequency modulation is exemplarily described, but is not limited to this. Specifically, in the case of transmitting data "1" to the power reception device 300, a power transmission unit 70 generates an AC voltage with a frequency f1, while in the case of transmitting data "0" to the power reception device 300, the power transmission unit 70 generates an AC voltage with a frequency f2. In this way, AC power including the data is transmitted from the power transmission side to the power reception side. Receiving the AC power, the power transmission device 300 detects and demodulates a change in the frequency of the power transmission wave, thereby detecting the data "1" or the data "0" transmitted from the power transmission side to the power reception side.

By comparison, data communication from the power reception side to the power transmission side is implemented by load modulation. Specifically, a load modulation unit 320 at the power reception side changes the load state at the power reception side according to data to be transmitted to the power transmission side, thereby changing a waveform of a voltage (power transmission wave) induced by the primary coil 60. For example, in the case of transmitting data "1" from the power reception side to the power transmission side, the power reception side is placed in a high-load state, while in the case of transmitting the data "0" from the power reception side to the power transmission side, the power reception side is placed in a low-load state. Thus, a control circuit 82 at the power transmission side detects (demodulates) the change in the load state at the power reception side based on a voltage inducted by the primary coil 60, thereby detecting the data "1" or the data "0" transmitted from the power reception side.

[Configuration of Power Transmission Device]

Hereinafter, the configuration of the power transmission device in the power transmission system of FIG. 1 will be described.

The power transmission device (also referred to as primary module) 200 includes the power transmission host 2, the primary coil 60, the power transmission unit 70, a power-transmission control device 80, and a waveform monitor circuit 100.

The power transmission host 2 includes, for example, a CPU, an application processor, an ASIC circuit, etc., and performs various processes such as overall control process of the electronic equipment at the power transmission side including the power transmission host 2 and the power transmission device 200.

The primary coil (also referred to as power transmission coil) 60 is electromagnetically coupled to the secondary coil (also referred to as power reception coil) 390 to construct a power transmission transformer. The primary coil 60 is provided with a coil end node 50 at which the electric potential of a coil end signal V50 is generated. The coil end node 50 is connected to the waveform monitor circuit 100.

The waveform monitor circuit 100 generates a waveform monitor signal V20 to be supplied to the waveform detection circuit 40, based on the coil end signal V50 appearing at the coil end node 50 of the primary coil 60. For example, the coil end signal V50 of the primary coil 60 becomes greater than a maximum rated voltage of the power-transmission control device 80 or becomes a negative voltage. The waveform monitor circuit 100 receives the coil end signal V50 from the primary coil 60 and generates the waveform monitor signal V20 by which the load state is to be detected by the waveform detection circuit 40 of the power-transmission control device 80, and outputs the waveform monitor signal V20 to a waveform monitor terminal (IC terminal) 42 of the power-transmission control device 80.

During the power transmission, the power transmission unit 70 generates an AC voltage with a predetermined frequency corresponding to a drive signal from a modulation circuit 130 and supplies the AC voltage to the primary coil 60. On the other hand, during the data transfer, the power transmission unit 70 generates an AC voltage with a different frequency corresponding to the data to be transmitted to the power reception side and supplies the AC voltage to the primary coil 60. The power transmission unit 70 includes, for example, a first power transmission driver for driving one end of the primary coil 60 and a second power transmission driver for driving the other end of the primary coil 60. The first and second power transmission drivers included in the power transmission unit 70 are implemented by inverter circuits constituted by, for example, power-MOS transistors, respectively, and are controlled by the power-transmission control device 80.

The power-transmission control device 80 is configured to perform control processes for the components of the power transmission device 200, and includes, an integrated circuit, a microcomputer, programs of the microcomputer, etc. The power-transmission control device 80 includes a binary data output circuit 120, the modulation circuit 130, the waveform detection circuit 40, a data detection circuit 45, and a control circuit 82.

The binary data output circuit 120 generates binary data of "0" or "1" transferred from the power transmission host 2 to the power reception host 4. The modulation circuit 130 generates a drive signal with a different frequency corresponding to the binary data transferred from the power transmission host 2 to the power reception host 4, and drives the first power transmission driver and the second power transmission driver constituting the power transmission unit 70 by the drive signal.

The waveform detection circuit 40 detects a change in the waveform of the waveform monitor signal V20 corresponding to the coil end signal V50 taken out from one end of the primary coil 60. For example, when a load current as a load state at the power reception side, changes, the waveform of the coil end signal V50 taken out from one end of the primary coil 60, and hence the waveform of the waveform monitor signal V20 formed by processing the coil end signal V50, change. The waveform detection circuit 40 detects a change in the waveform of the waveform monitor signal V20.

The data detection circuit 45 detects data transmitted by load modulation by a load modulation unit 320 in the power reception device 300, based on a result of detection of the waveform detected by the waveform detection circuit 40.

The control circuit 82 controls the power-transmission control device 80 and the power transmission device 200. The control circuit 82 includes, for example, an ASIC circuit such as a gate array, and programs of a microcomputer. Specifically, the control circuit 82 performs sequence control processes and determination processes required for power transmission, load state detection, frequency modulation, etc. Particularly, the control circuit 82 detects the load state (load fluctuation, high load state or low load state) at the power reception side, based on the data detected by the data detection circuit 45.

[Configuration of Power Reception Device]

Hereinafter, the configuration of the power reception device 300 in the power transmission system of FIG. 1 will be described.

The power reception device (also referred to as secondary module) 300 includes the secondary coil 390, a power reception unit 310, the load modulation unit 320, a power-supply control unit 330, and a power-reception control device 340.

The power reception unit 310 converts an AC waveform monitor signal of the secondary coil 390 into a DC voltage. This conversion is implemented by a rectification circuit, or the like included in the power reception unit 310.

The load modulation unit 320 performs a load modulation process. Specifically, the load modulation unit 320 changes the load state according to the data to be transmitted, when the data is transmitted from the power reception side to the power transmission side, thereby changing the waveform of the coil end signal V50 induced by the primary coil 60.

The power-supply control unit 330 controls activation or deactivation of the power feeding to the load 90. Specifically, the power-supply control unit 330 controls the electric power supplied to the load 90 based on the DC voltage obtained by conversion in the power reception unit 310.

The power-reception control device 340 includes an integrated circuit (IC), a microcomputer operative according to programs, etc. The power-reception control device 340 performs sequence control processes and determination processes which are required for position detection, frequency detection, load modulation, fully charged state detection, etc.

[Configuration of Waveform Monitor Circuit]

Figure 2:
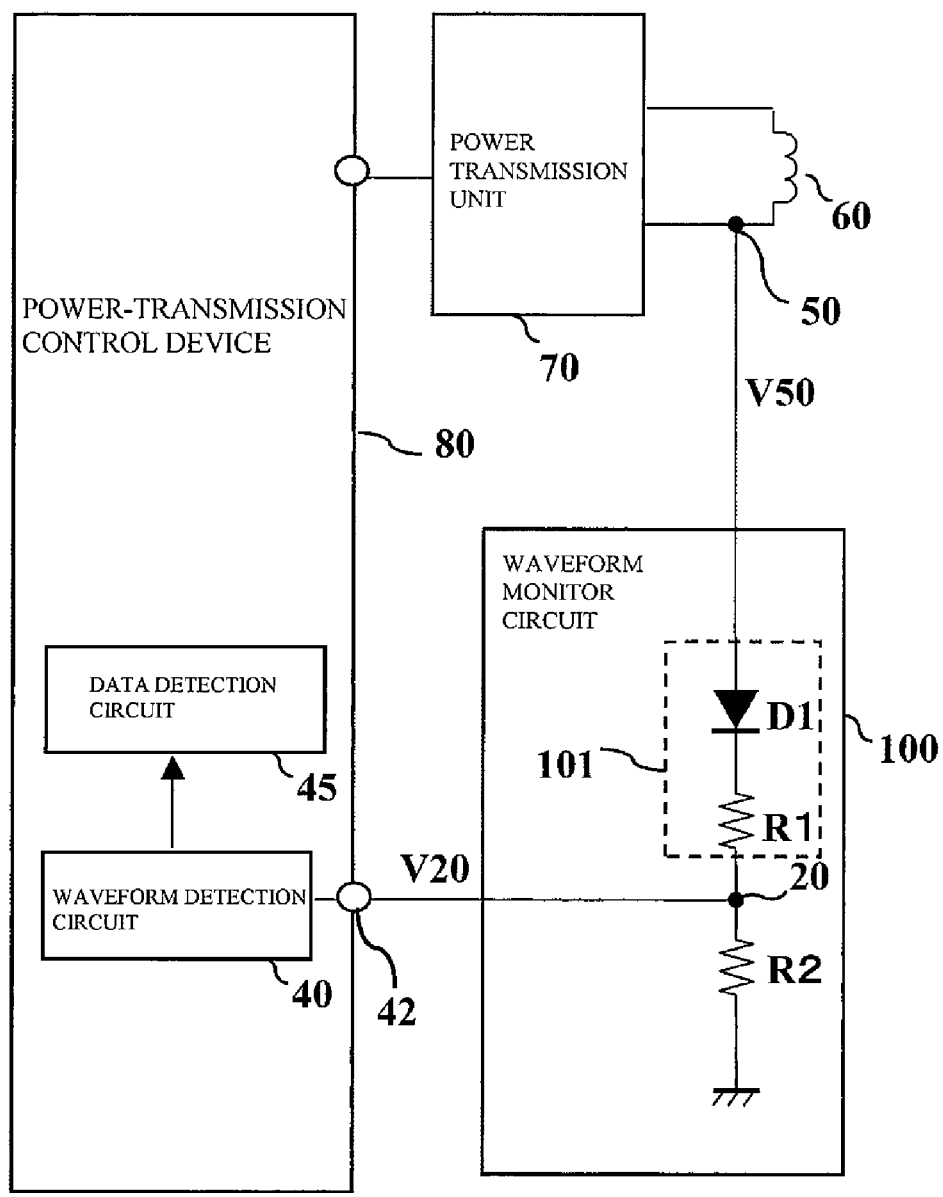
FIG. 2 is a circuit diagram showing the configuration of a waveform monitor circuit according to Embodiment 1 of the present invention, and a peripheral circuit thereof.

Hereinafter, a description will be given of the configuration of the waveform monitor circuit 100 according to Embodiment 1 of the present invention, and a peripheral circuit thereof. FIG. 2 is a circuit diagram showing the configuration of the waveform monitor circuit 100 according to Embodiment 1 of the present invention, and the peripheral circuit thereof.

Referring to FIG. 2, the power-transmission control device 80 drives the first and second power transmission drivers constituting the power transmission unit 70 for driving the primary coil 60. Thus, the electric power is transmitted from the power transmission side to the power reception side.

By comparison, when data is communicated from the power reception side to the power transmission side, the load modulation unit 320 at the power reception side changes the load state at the power reception side according to data to be transmitted, thereby changing the voltage induced by the primary coil 60. At this time, receiving the coil end signal V50 from the coil end node 50 of the primary coil 60, the waveform monitor circuit 100 rectifies the coil end signal V50 to generate the waveform monitor signal V20 used for detecting the load state, and outputs the waveform monitor signal V20 to the waveform monitor terminal 42 of the power-transmission control device 80. The waveform detection circuit 40 of the power-transmission control device 80 detects a change in the waveform of the waveform monitor signal V20 received via the waveform monitor terminal 42. The data detection circuit 45 detects data transmitted by the load modulation by the load modulation unit 320 in the power reception device 300, based on a result of detection of the waveform change detected by the waveform detection circuit 40, and transmits the detected data to the control circuit 82. Thereby, the load state at the power reception side (secondary side) can be detected in the power transmission side (primary side), and the data transmitted from the power reception device 300 can be detected.

The waveform monitor circuit 100 is configured in such a manner that a diode D1 (diode of the present invention), a resistor R1 (second resistor of the present invention), and a resistor R2 (first resistor of the present invention) are connected in series between the coil end node 50 of the primary coil 60 and the ground terminal (low electric potential power supply node). A rectification circuit 101 includes the diode D1 and the resistor R1. In greater detail, the diode D1 is connected at its anode side to the coil end node 50 of the primary coil 60 and its cathode side to one end of the resistor R1. The other end of the resistor R1 is connected to one end of the resistor R2. The other end of the resistor R2 is connected to a ground terminal. A connection point of the resistor R1 and the resistor R2 is defined as a monitor node 20. The monitor node 20 is connected to the waveform monitor terminal 42 of the power-transmission control device 80.

[Operation of Waveform Monitor Circuit]

Hereinafter, the operation of the waveform monitor circuit 100 shown in FIG. 2 will be described.

In a case where the electric potential of the coil end signal V50 appearing at the coil end node 50 is higher than an electric potential (=ground electric potential+VT1) higher than the electric potential (ground electric potential) of the ground terminal by a forward voltage VT1 of the diode D1, a forward current flows through the diode D1 from the coil end node 50 toward the ground terminal. This forward current also flows through the resistor R1 and the resistor R2. Therefore, the electric potential of the waveform monitor signal V20 appearing at the monitor node 20 is determined based on, the forward voltage (threshold voltage) VT1 of the diode D1, corresponding to the coil end signal V50, a voltage drop at the resistor R1 (=resistance value of the resistor R1×forward current of the diode D1), and a voltage drop at the resistor R2 (=resistance value of the resistor R2×forward current of the diode D1). To be specific, the electric potential of the waveform monitor signal V20 appearing at the monitor node 20 is derived by dividing an electric potential difference between the ground electric potential and an electric potential obtained by subtracting the forward voltage VT1 of the diode D1 from the electric potential of the coil end signal V50, by a voltage division ratio between the resistor R1 and the resistor R2. This allows the electric potential of the waveform monitor signal V20 to be set not to exceed a maximum rated electric potential of the power-transmission control device 80.

When the electric potential of the coil end signal V50 appearing at the coil end node 50 is coming closer to the electric potential (=ground electric potential+VT1) higher than the electric potential of the ground terminal by the forward voltage VT1 of the diode D1, the forward current flowing through the diode D1 starts to decrease. Because of this, the electric potential of the waveform monitor signal V20 appearing at the monitor node 20 is coming closer to the electric potential at the ground terminal.

When the electric potential of the coil end signal V50 appearing at the coil end node 50 is lower than the electric potential (=ground electric potential+VT1) higher than the electric potential of the ground terminal by the forward voltage VT1 of the diode D1, the forward current in the direction from the coil end node 50 toward the ground terminal, does not flow through the diode D1. Because of this, the electric potential of the waveform monitor signal V20 appearing at the monitor node 20 becomes equal to the electric potential at the ground terminal.

Figure 3A:
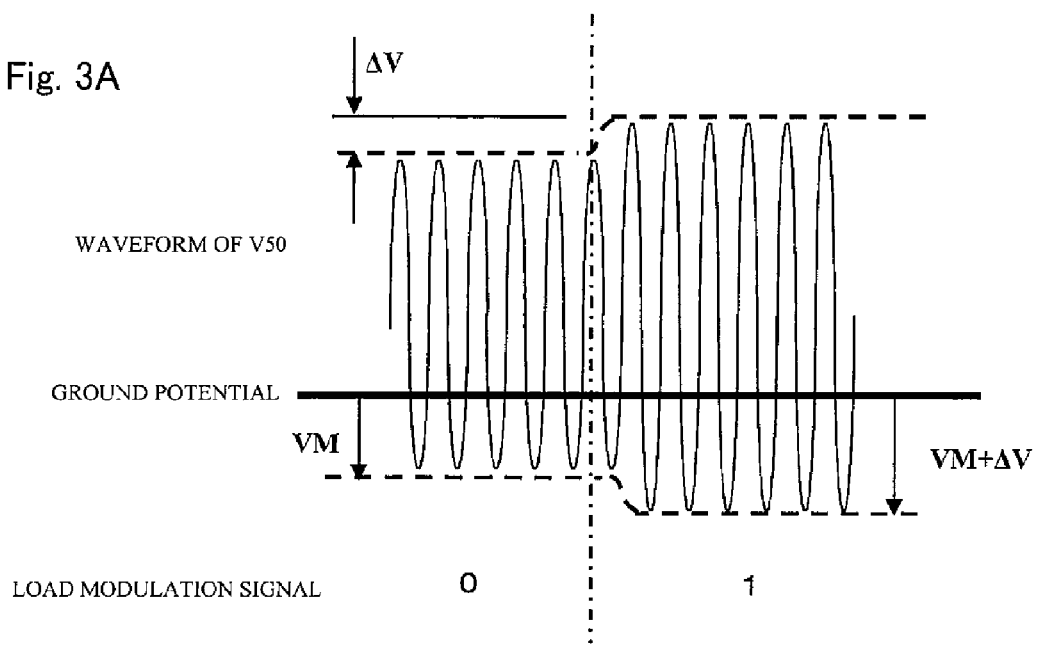
FIG. 3A is a waveform diagram showing a waveform of a coil end signal appearing at a coil end node of a power transmission device according to Embodiment 1 of the present invention.
Figure 3B:
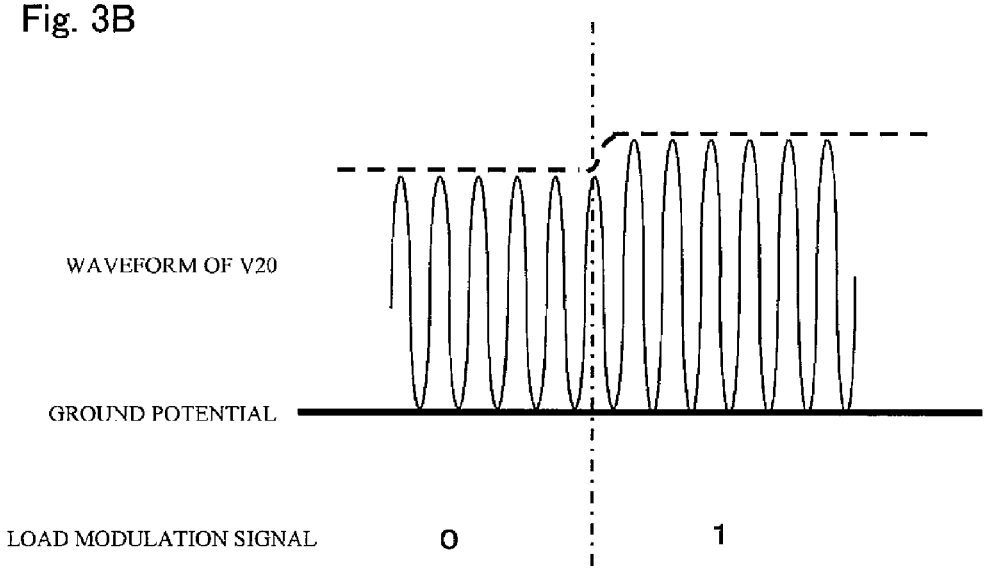
FIG. 3B is a view showing a waveform of a waveform monitor signal appearing at a monitor node corresponding to FIG. 3A.

FIG. 3A is a waveform diagram showing a waveform of the coil end signal V50 appearing at the coil end node 50 based on a load modulation method. FIG. 3B is a view showing the waveform of the waveform monitor signal V20 appearing at the monitor node 20 corresponding to FIG. 3A.

As shown in FIG. 3A, the electric potential of the coil end signal V50 appearing at the coil end node 50 changes according to the load modulation when data is transferred from the power reception side to the power transmission side. A voltage reference of the primary coil 60 is not defined. Therefore, as shown in FIG. 3A, there are a case where the coil end signal V50 of the primary coil 60 becomes a positive voltage on the basis of the ground electric potential (ground potential), and a case where the coil end signal V50 of the primary coil 60 becomes a negative voltage on the basis of the ground electric potential.

As shown in FIG. 3B, in the case where the electric potential of the coil end signal V50 appearing at the coil end node 50 changes from the positive voltage to the negative voltage on the basis of the ground electric potential, it is ensured that the electric potential of the waveform monitor signal V20 appearing at the monitor node 20 is always a positive value higher than the ground electric potential. Therefore, it is possible to prevent the negative voltage from being applied to the waveform monitor terminal 42 of the power-transmission control device 80, and thereby prevent occurrence a parasitic effect (latch up, etc.) which causes breakdown of an electric circuit element included in the power-transmission control device 80.

[Modified Example of Waveform Monitor Circuit]

Figure 4:
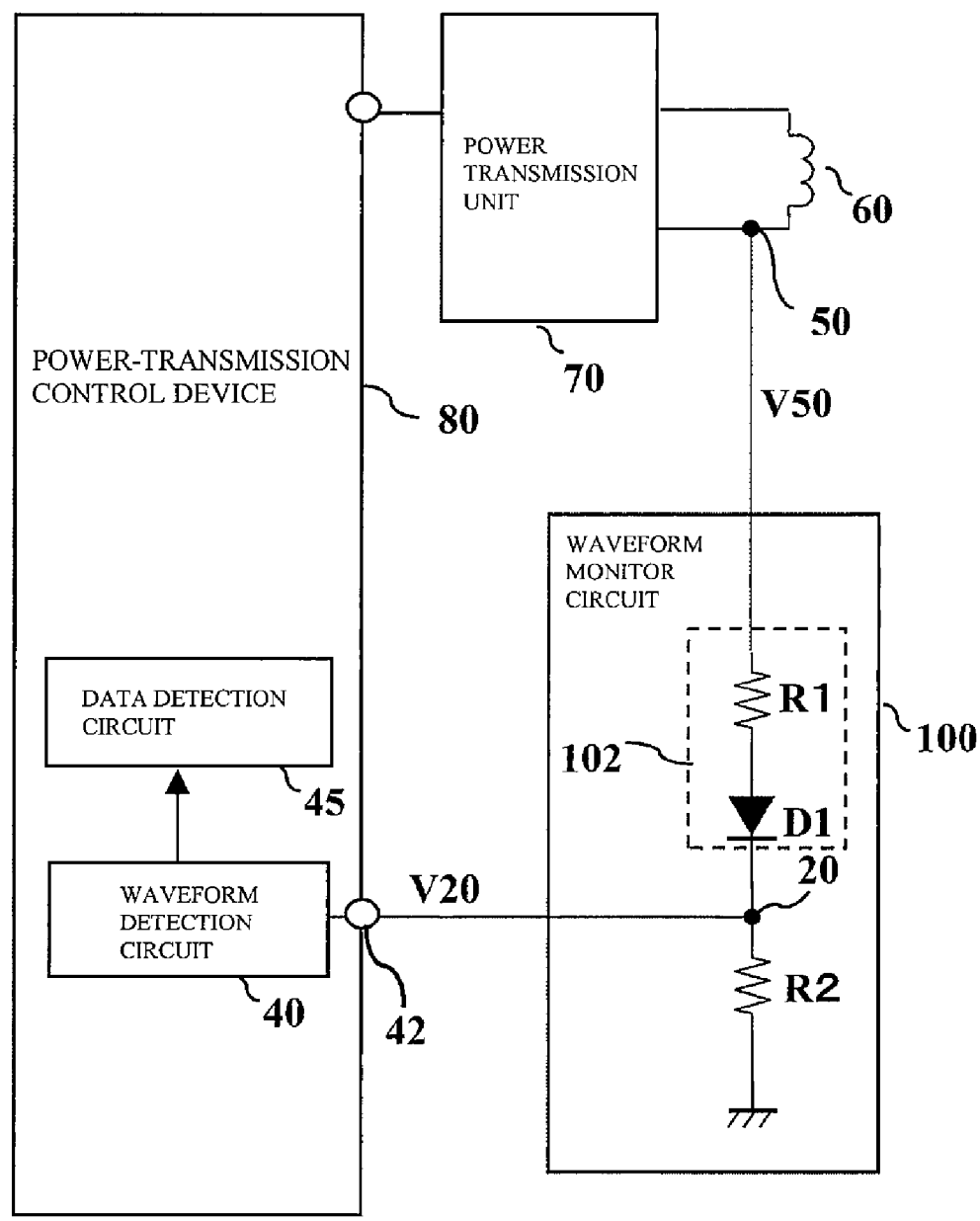
FIG. 4 is a circuit diagram showing modified example 1 of the waveform monitor circuit of FIG. 2.

FIG. 4 is a circuit diagram showing modified example 1 of the waveform monitor circuit 100 of FIG. 2. Referring to FIG. 4, the waveform monitor circuit 100 of FIG. 4 is different from the waveform monitor circuit 100 of FIG. 2 in that the positional relationship between the diode D1 (diode of the present invention) and the resistor R1 (second resistor of the present invention) is reversed in a rectification circuit 102. In this modified example, the same advantages as those of the waveform monitor circuit 100 of FIG. 2 are achieved.

Figure 5:
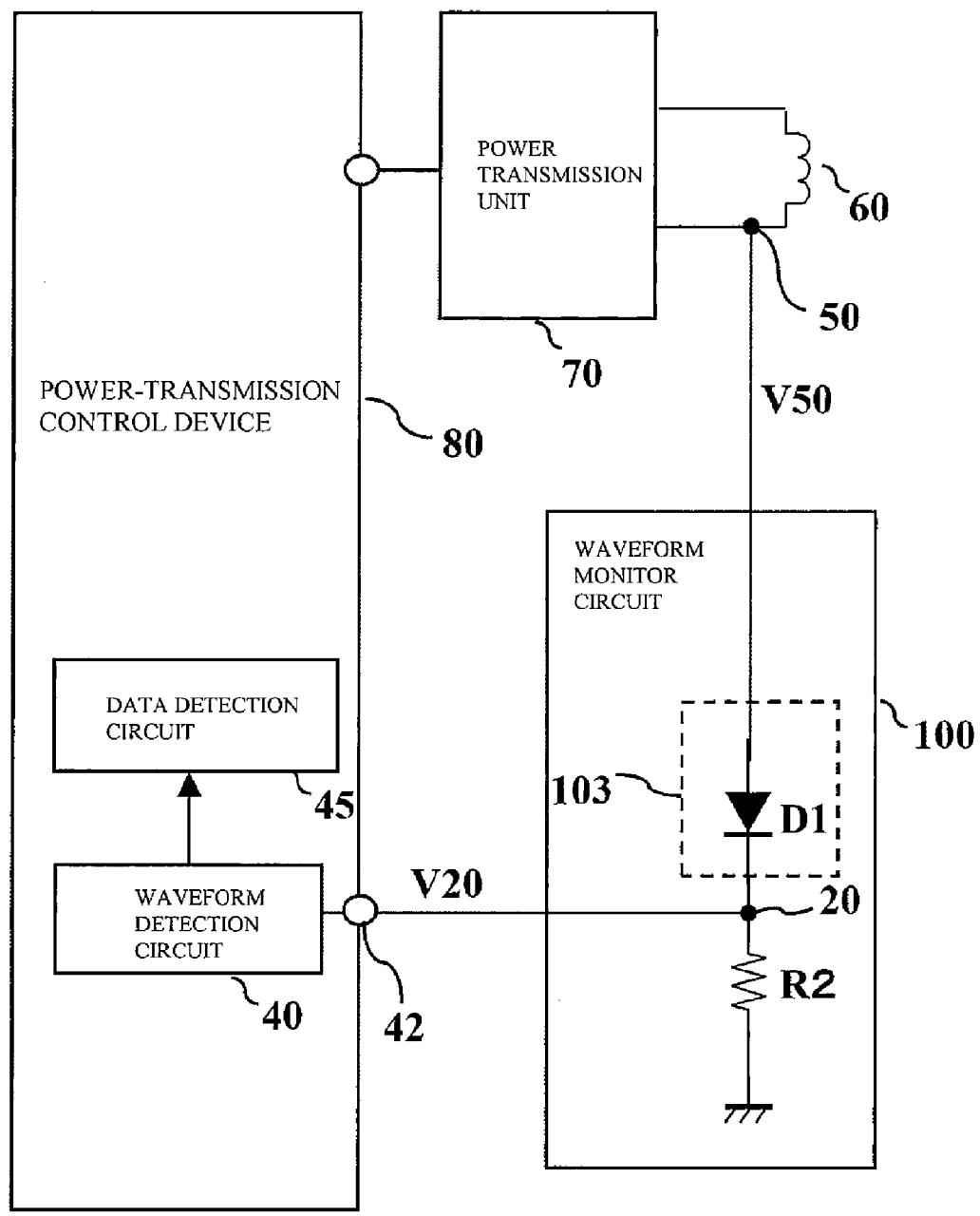
FIG. 5 is a circuit diagram showing modified example 2 of the waveform monitor circuit of FIG. 2.

FIG. 5 is a circuit diagram showing modified example 2 of the waveform monitor circuit 100 of FIG. 2. Referring to FIG. 5, the waveform monitor circuit 100 is different from the waveform monitor circuit 100 of FIG. 2 in that a rectification circuit 103 does not include the resistor R1 (second resistor of the present invention) in the rectification circuit 101 of the waveform monitor circuit 100 of FIG. 2, and consists of the diode D1 (diode of the present invention). In this modified example, the same advantages as those of the waveform monitor circuit 100 of FIG. 2 are achieved.

The diode D1 shown in FIGS. 2, 4, and 5 may be a transistor connected to a diode. Or, the diode D1 shown in FIGS. 2, 4, and 5 may be a Schottky barrier diode in which a direction from the coil end node 50 toward the waveform monitor terminal 42 is a forward direction. Or, the diode D1 shown in FIGS. 2, 4, and 5 may be a zener diode in which a direction from the coil end node 50 toward the waveform monitor terminal 42 is a forward direction.

(Embodiment 2)

[Configuration of Power Transmission System]

The configuration of a power transmission system of Embodiment 2 of the present invention is identical to that of Embodiment 1 of FIG. 1, and will not be described in detail.

[Configuration of Waveform Monitor Circuit]

Figure 6:
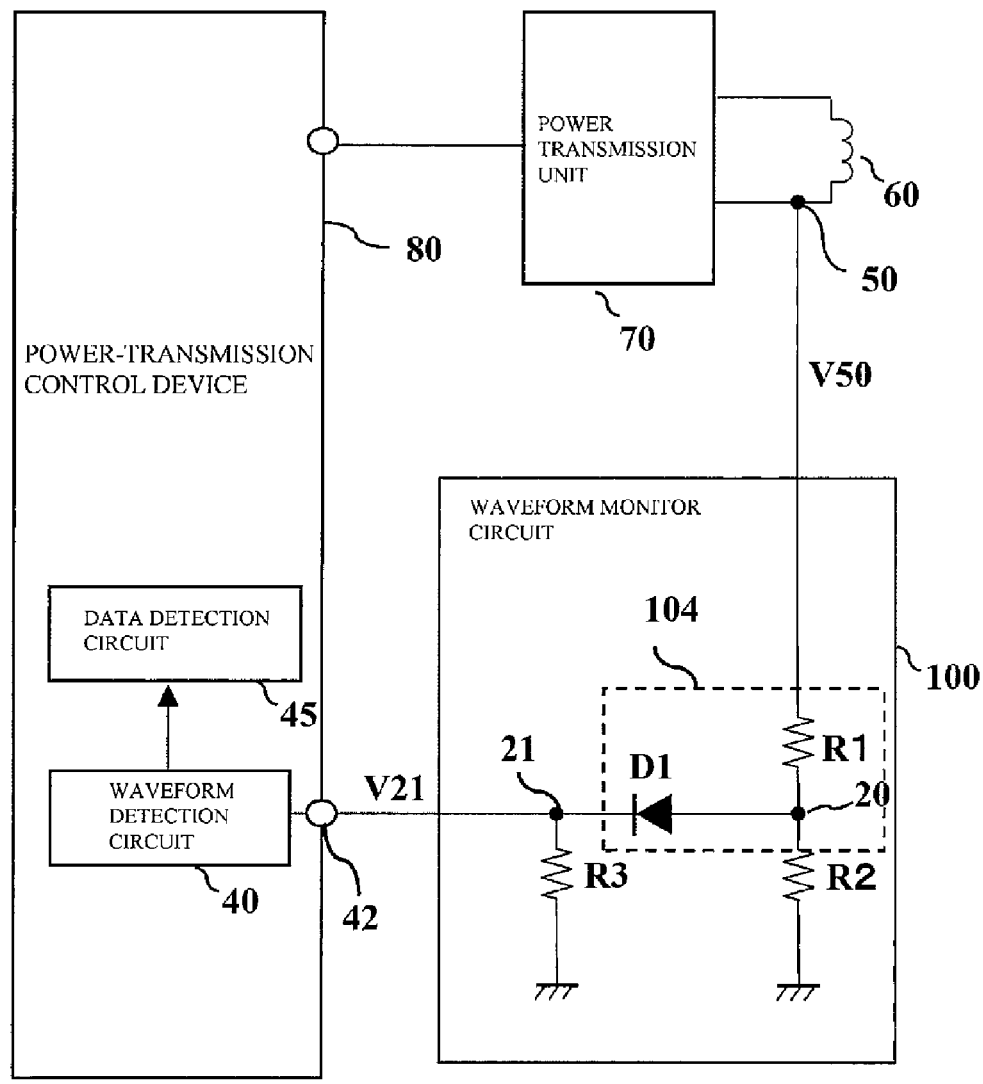
FIG. 6 is a block diagram showing the configuration of a waveform monitor circuit according to Embodiment 2 of the present invention, and a peripheral circuit thereof.

FIG. 6 is a circuit diagram showing the configuration of the waveform monitor circuit 100 according to Embodiment 2 of the present invention.

The waveform monitor circuit 100 of FIG. 6 is different from the waveform monitor circuit 100 of FIG. 2 in the position of the diode D1 and addition of a resistor R3 (third resistor) of the present invention).

The waveform monitor circuit 100 of FIG. 6 is configured in such a manner that the resistor R1 (second resistor of the present invention) and the resistor R2 (first resistor of the present invention) are connected in series between the coil end node 50 of the primary coil 60 and the ground terminal (low electric potential power supply node). A connection point between the resistor R1 and the resistor R2 is defined as the monitor node 20. Note that in the present embodiment, the waveform monitor circuit 100 does not monitor the waveform monitor signal appearing at the monitor node 20, but monitors the waveform monitor signal appearing at a monitor node 21 as will be described later.

The diode D1 (diode of the present invention) is provided between the monitor node 20 and the waveform monitor terminal 42. The diode D1 is connected at its anode side to the monitor node 20 and its cathode side to the waveform monitor terminal 42. A rectification circuit 104 includes the resistor R1 and the diode D1.

The monitor node 21 is defined on a signal line between the diode D1 and the waveform monitor terminal 42. The monitor node 21 is electrically grounded via the resistor R3 (third resistor of the present invention). A waveform monitor signal V21 appearing at the monitor node 21 is applied to the waveform monitor terminal 42 of the power-transmission control device 80.

When the electric potential at the monitor node 20 which is obtained by dividing the electric potential of the coil end signal V50 appearing at the coil end node 50, by a voltage division ratio between the resistor R1 and the resistor R2, is higher than the electric potential (=ground electric potential+ VT1) higher than the electric potential (ground electric potential) of the ground terminal, by the forward voltage T1 of the diode D1, there are formed a current path from the coil end node 50 to the ground terminal via the resistor R1, the diode D1 and the resistor R3, and a current path from the coil end node 50 to the ground terminal via the resistor R1 and the resistor R2. That is, a forward current flows through the diode D1. Therefore, the electric potential of the waveform monitor signal V21 appearing at the monitor node 21 is determined based on a voltage drop at the resistor R1 (=resistance value of the resistor R1×(forward current of the diode D1 plus a current flowing through the resistor R2)), a forward voltage (threshold voltage) VT1 of the diode D1, corresponding to the coil end signal V50, and a voltage drop at the resistor R3 (=resistance value of the resistor R3×(forward current of the diode D1).

When the electric potential at the monitor node 20 which is obtained by dividing the electric potential of the coil end signal V50 appearing at the coil end node 50, by the voltage division ratio between the resistor R1 and the resistor R2, is coming closer to the electric potential (=ground electric potential+VT1) higher than the electric potential of the ground terminal, by the forward voltage VT1 of the diode D1, the forward current flowing through the diode D1 starts to decrease. Because of this, the electric potential of the waveform monitor signal V21 appearing at the monitor node 21 is coming closer to the electric potential at the ground terminal.

When the electric potential at the monitor node 20 which is obtained by dividing the electric potential of the coil end signal V50 appearing at the coil end node 50, by the voltage division ratio between the resistor R1 and the resistor R2, is lower than the electric potential (=ground electric potential+ VT1) higher than the electric potential of the ground terminal by the forward voltage VT1 of the diode D1, the forward current in the direction from the coil end node 50 toward the ground terminal, does not flow through the diode Dl. Because of this, the electric potential of the waveform monitor signal V20 appearing at the monitor node 20 becomes equal to the electric potential at the ground terminal.

As described above, the waveform monitor circuit 100 of FIG. 6 can achieve the same advantages as those of the waveform monitor circuit 100 of FIG. 2.

[Modified Example]

Figure 7:
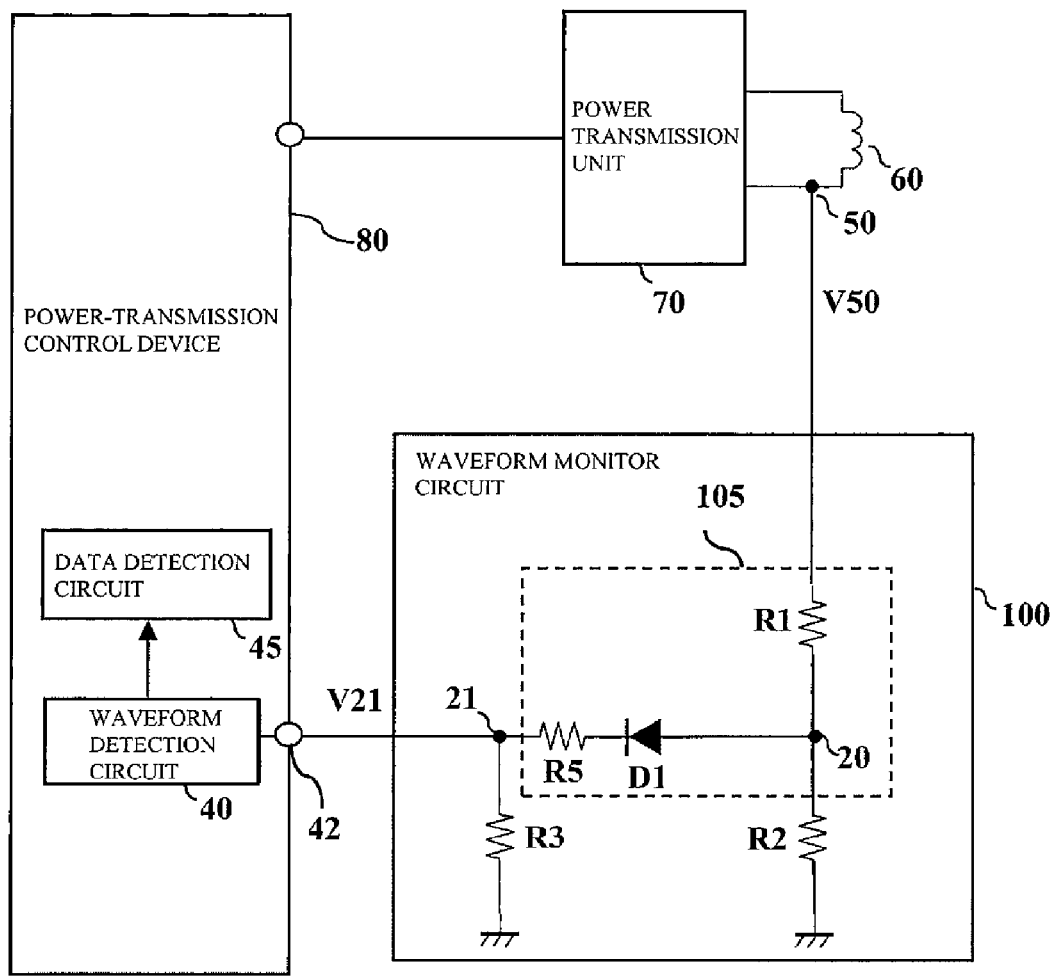
FIG. 7 is a circuit diagram showing modified example 1 of the waveform monitor circuit of FIG. 6.

FIG. 7 is a circuit diagram showing modified example 1 of the waveform monitor circuit 100 of FIG. 6. The waveform monitor circuit 100 of FIG. 7 is different from the waveform monitor circuit 100 of FIG. 6 in that a resistor R5 (fourth resistor of the present invention) is added to the waveform monitor circuit 100 of FIG. 6 between the cathode of the diode D1 and the monitor terminal 42. A rectification circuit 105 of FIG. 7 includes the resistor R1, the diode D1, and the resistor R5. In this modified example, the same advantages as those of the waveform monitor circuit 100 of FIG. 6 are achieved.

Figure 8:
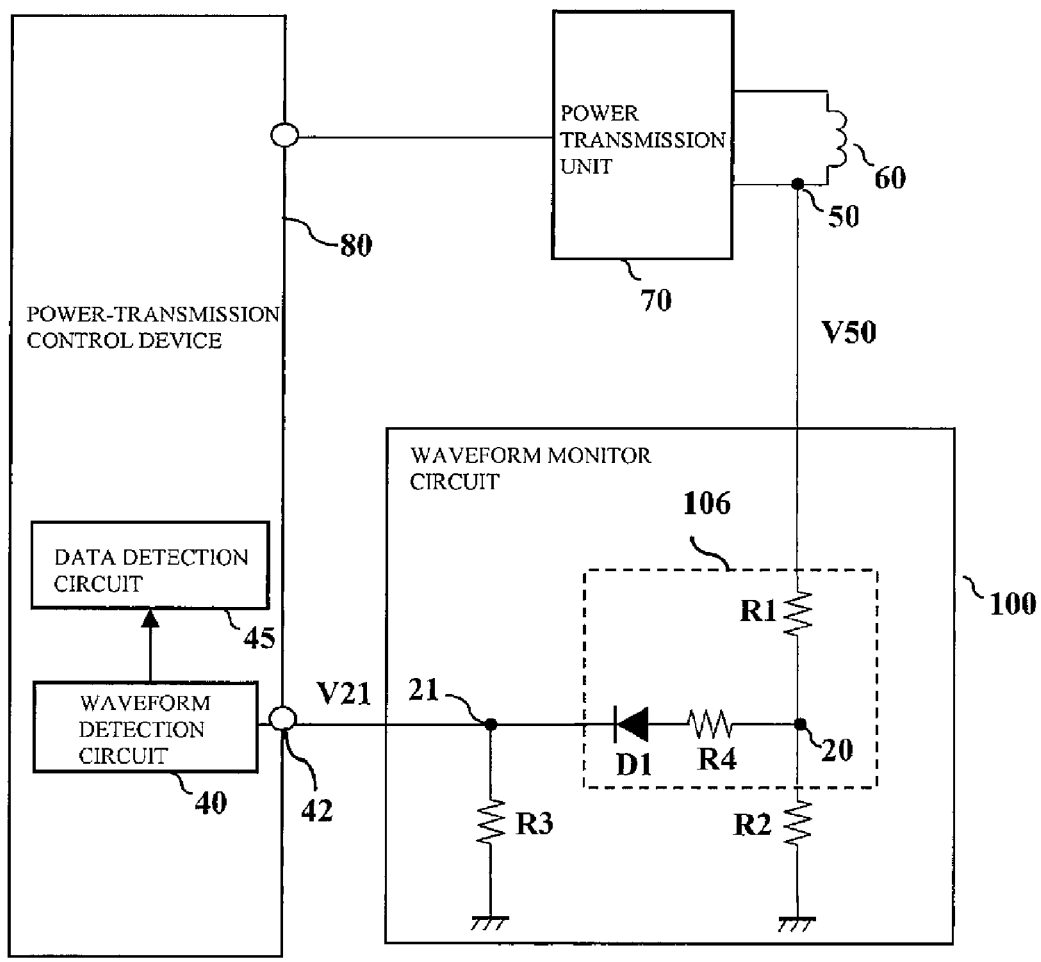
FIG. 8 is a circuit diagram showing modified example 2 of the waveform monitor circuit of FIG. 6.

FIG. 8 is a circuit diagram showing modified example 2 of the waveform monitor circuit 100 of FIG. 6. The waveform monitor circuit 100 of FIG. 8 is different from the waveform monitor circuit 100 of FIG. 6 in that a resistor R4 (fifth resistor of the present invention) is added to the waveform monitor circuit 100 of FIG. 6 between the monitor node 20 and the anode of the diode D1. A rectification circuit 106 of FIG. 8 includes the resistor R1, the resistor R4 and the diode D1. In this modified example, the same advantages as those of the waveform monitor circuit 100 of FIG. 6 are achieved.

Figure 9:
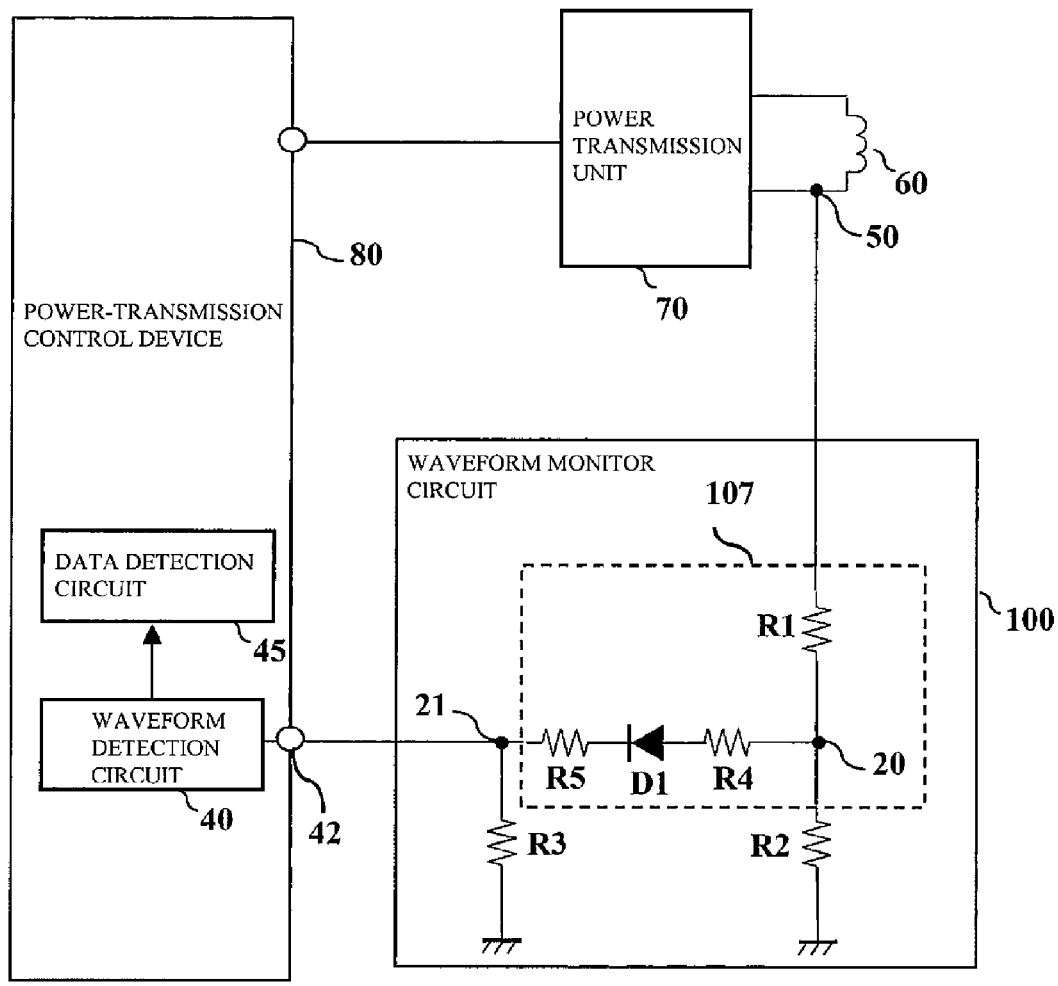
FIG. 9 is a circuit diagram showing modified example 3 of the waveform monitor circuit of FIG. 6.
Figure 10:
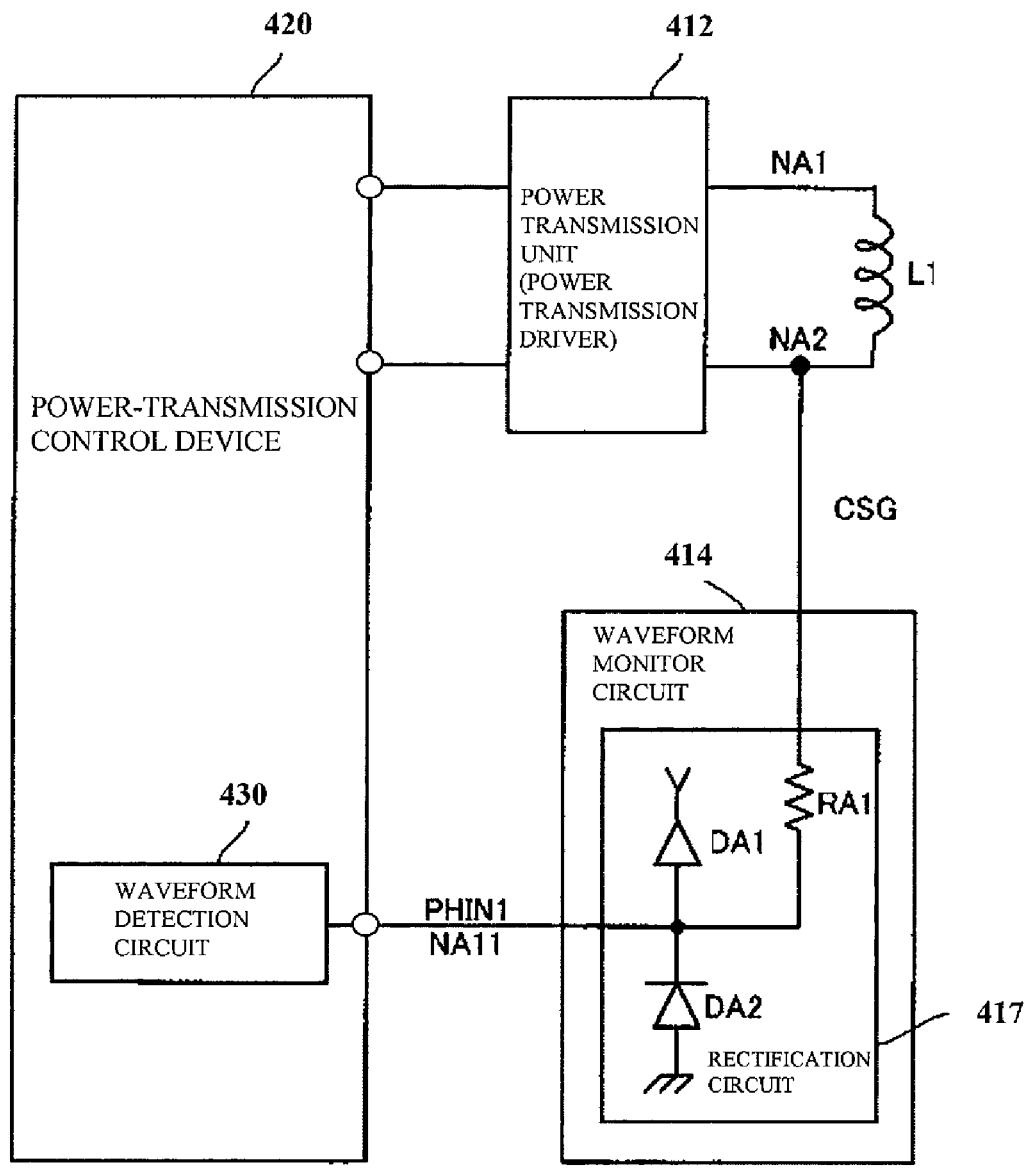
FIG. 10 is a block diagram showing the configuration of a power transmission device in a power transmission system including a conventional waveform monitor circuit.

FIG. 9 is a circuit diagram showing modified example 3 of the waveform monitor circuit 100 of FIG. 6. The waveform monitor circuit 100 of FIG. 8 is different from the waveform monitor circuit 100 of FIG. 6 in that the resistor R5 (fourth resistor of the present invention) is added to the waveform monitor circuit 100 of FIG. 6 between the cathode of the diode D1 and the monitor terminal 42, and the resistor R4 (fifth resistor of the present invention) is added to the waveform monitor circuit 100 of FIG. 6 between the monitor node 20 and the anode of the diode Dl. A rectification circuit 107 of FIG. 9 includes the resistor R1, the resistor R4, the diode D1 and the resistor R5. In this modified example, same advantages as those of the waveform monitor circuit 100 of FIG. 6 are achieved.

The diode D1 shown in FIGS. 6 to 9 may be a transistor connected to a diode. Or, the diode D1 shown in FIGS. 6 to 9 may be a Schottky barrier diode in which a direction from the coil end node 50 toward the waveform monitor terminal 42 is a forward direction. Or, the diode D1 shown in FIGS. 6 to 9 may be a zener diode in which a direction from the coil end node 50 toward the waveform monitor terminal 42 is a forward direction.

A power transmission system and a waveform monitor circuit for use in the power transmission system, according to the present invention, are useful as a power transmission system which performs data transfer from a power reception side to a power transmission side by load modulation, and a waveform monitor circuit for use in the power transmission system.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:
1. A power transmission device comprising:
a primary coil;
a waveform monitor circuit configured to detect an electric potential at one end of the primary coil, and output a waveform monitor signal formed by restricting the detected electric potential to an electric potential which is equal to or higher than a reference electric potential;

a waveform detection circuit configured to detect a waveform change in the waveform monitor signal input from the waveform monitor circuit; and a data detection circuit configured to detect data transmitted from a power reception device to the power transmission device based on a result of detection of the waveform change detected by the waveform detection circuit, wherein:

the waveform monitor circuit includes:

a rectification circuit including a diode, the diode being provided in series between the one end of the primary coil and an input end of the waveform detection circuit such that a direction from the one end of the primary coil to the input end of the waveform detection circuit is a forward direction of the diode; and a first resistor, one end of which is connected to a node on a signal line between a cathode side of the diode and the input end of the waveform detection circuit, and another end of which is connected to a ground terminal held at a ground electric potential.

2. The power transmission device according to claim 1, wherein the rectification circuit further includes a second resistor provided between the cathode side of the diode and the node.

3. The power transmission device according to claim 1, wherein the rectification circuit further includes a second resistor provided between the one end of the primary coil and an anode side of the diode.

4. A power transmission device comprising:

a primary coil;

a waveform monitor circuit configured to detect an electric potential at one end of the primary coil, and output a waveform monitor signal formed by restricting the detected electric potential to an electric potential which is equal to or higher than a reference electric potential;

a waveform detection circuit configured to detect a waveform change in the waveform monitor signal input from the waveform monitor circuit; and a data detection circuit configured to detect data transmitted from a power reception device to the power transmission device based on a result of detection of the waveform change detected by the waveform detection circuit, wherein:

the waveform monitor circuit includes:

a rectification circuit including a diode and a second resistor, the diode being provided in series between the one end of the primary coil and an input end of the waveform detection circuit such that a direction from the one end of the primary coil toward the input end is a forward direction of the diode, and the second resistor being provided at an anode side of the diode;

a first resistor, one end of which is connected to a node on a signal line between the anode side of the diode and the second resistor, and another end of which is connected to a ground terminal held at a ground electric potential; and a third resistor, one end of which is connected to a cathode side of the diode and another end of which is connected to the ground terminal.

5. The power transmission device according to claim 4, wherein the rectification circuit further includes a fourth resistor provided between the cathode side of the diode and the input end of the waveform detection circuit.

6. The power transmission device according to claim 4, wherein the rectification circuit further includes a fifth resistor provided between the anode side of the diode and the node.

7. The power transmission device according to claim 1, wherein the diode is a Schottky barrier diode.

8. The power transmission device according to claim 1, wherein the diode is a Zener diode.

9. A waveform monitor circuit comprising:

an input terminal to be connected to one end of a primary coil of a power transmission device;

an output terminal to be connected to an waveform detection circuit of the power transmission device;

a rectification circuit including a diode, the diode being provided in series between the input terminal and the output terminal such that a direction from the input terminal to the output terminal is a forward direction of the diode; and a first resistor, one end of which is connected to a node on a signal line between an output end of the rectification circuit and the output terminal, and the other end of which is connected to a ground terminal held at a ground electric potential.

10. A waveform monitor circuit comprising:

an input terminal to be connected to one end of a primary coil of a power transmission device;

an output terminal to be connected to an waveform detection circuit of the power transmission device;

a rectification circuit including a diode and a second resistor, the diode being provided in series between the input terminal and the output terminal such that a direction from the input terminal to the output terminal is a forward direction of the diode, and the second resistor being provided at an anode side of the diode;

a first resistor, one end of which is connected to a signal line between an anode side of the diode and the second resistor, and the other end of which is connected to a ground terminal held at a ground electric potential; and a third resistor, one end of which is connected to a cathode side of the diode and the other end of which is connected to the ground terminal.

11. The power transmission device according to claim 4, wherein the diode is a Schottky barrier diode.

12. The power transmission device according to claim 4, wherein the diode is a Zener diode.

* * * * *